Oct. 7, 1930.                J. LENTÉ                1,777,977
                       JOINT FOR PIPES AND TUBES
                         Filed Dec. 12, 1927
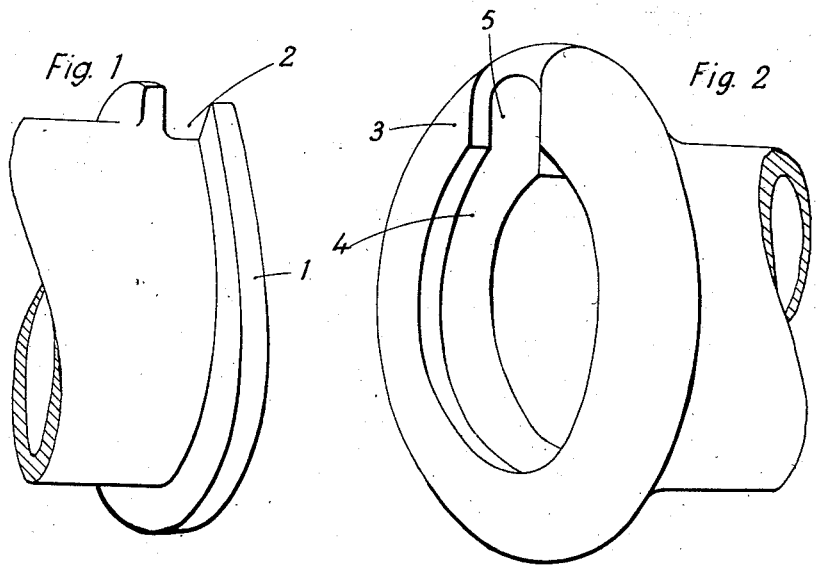
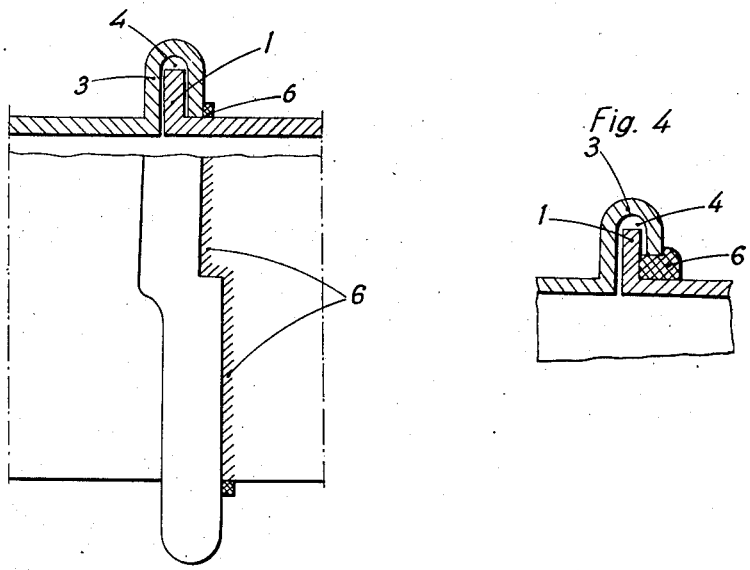
J. Lenté
  INVENTOR
By Marks & Clerk
      Attys.

Patented Oct. 7, 1930

1,777,977

UNITED STATES PATENT OFFICE

JACQUES LENTÉ, OF PARIS, FRANCE, ASSIGNOR TO SOCIETE ANONYME D'ESCAUT & MEUSE, OF PARIS, FRANCE

JOINT FOR PIPES AND TUBES

Application filed December 12, 1927, Serial No. 239,581, and in France September 21, 1927.

The present invention relates to an improved joint for pipes and tubes, applicable in particular to hydraulic pipes or tubes, in which the separate parts of the joint are made integral with the pipes to be assembled.

The characteristic distinguishing the invention, consists in providing a joint such that the operation of bending and traction is exerted merely upon the assembled whole itself, and not upon the soldering or welding as in the case of the assembled parts generally in use, as the soldering or welding merely serves to ensure hermeticity or staunchness.

The invention consists in providing the ends of the pipes or tubes to be assembled with collars arranged helically in suchwise as to enable one to be screwed into the other.

In the preferred constructional form the end of one of the tubes to be assembled carries a single collar interrupted at a part of its periphery and fashioned as a helix, whilst the end of the other tube is constituted by a double collar also fashioned as a helix and provided with an opening. The single collar is introduced into the double collar and the assembling is obtained by the simple rotation of one tube into the other. On welding or soldering the flange of the double collar a perfectly tight union is obtained.

To enable the invention to be well understood it is described with reference to the accompanying drawings, in which:

Figure 1 is a perspective view of a part of that tube provided with a single collar.

Figure 2 is a perspective view of that part of the tube provided with the double collar.

Figure 3 shows, partly in section, and partly in elevation, the complete assemblage.

Figure 4 shows a modification in the arrangement of the welding or soldering.

The end of one of the tubes to be assembled is provided with a single collar 1 formed as a helix and interrupted or having a space at a certain part of its periphery, as at 2 for example.

The end of the other tube has a double collar 3 forming an annular groove 4 also formed as a helix and having an opening 5.

The assembling of the two tubes is realized by the engagement of the single collar 1 with the annular groove 4 in the double collar 3 by means of the aperture 5 and by rotation of the two tubes one in relation to the other in suchwise as to screw the single collar 1 into the space in the double collar 3.

The assembling is completed by a welded or soldered joint 6 arranged in union with the external flange of the double collar 3, and with the tube having the single collar 1.

In Figure 4 there is shown a modification of the arrangement of the welding or soldering, in which the joint is produced between the external flange of the double collar 3 and the tube having the single collar 1.

The joint may also be completed by any plastic material utilized for making such joints, as for example rubber, lead, putty, leather and the like.

It will be quite evident that the single and double collars can be made with simple grooves or recesses and inlet orifices without altering the nature of the invention.

The improved means of assemblage can be used with advantage for all tubes or pipes of wrought or cast steel, of cast iron or any other suitable metals.

Claims:

1. A joint for relatively thick and rigid pipes and tubes, including in combination pipe sections, a single helical collar formed on the outer surface and at one end of one of the sections, and a double collar in the shape of a helix formed on the adjacent end of the adjacent section and providing a helical groove and also having an opening communicating with the groove so that the helical collar may be engaged in the opening and rotated into the groove, the engagement between the collars being such as to withstand mechanical stresses, and a welded joint between the double collar and first section to effect hermetic sealing of the pipe sections.

2. A joint for cast pipes and the like including in combination pipe sections, a single helical collar formed integral with the outer surface and the one end of one of the sections, and a double collar in the shape of a helix formed integral with the outer end portion of the adjacent section and providing a helical groove substantially U-shaped in cross section, said groove terminating at its outer end in an opening disposed laterally of the adjacent portion of the double collar so that the outer end edge of the helical collar may be disposed opposite the opening and rotated into interengagement with the groove, a welded joint between the double collar and the adjacent outer surface of the first pipe section to effect hermetic sealing of the pipe sections, and the engagement of the collars being such as to withstand mechanical stresses and thereby protect the welded joint.

In testimony whereof I affix my signature.

JACQUES LENTÉ.